United States Patent Office 3,386,928
Patented June 4, 1968

3,386,928
PROCESS OF FOAMING A POLYMERIZABLE
CYCLIC VINYL ETHER
Georges Emile Bernier, Beloeil Station, Quebec, Thomas Gilchrist, St. Lambert, Quebec, and Robert Harris Pallen, Beloeil, Quebec, Canada, assignors to Canadian Industries Limited, Quebec, Quebec, Canada, a corporation of Canada
No Drawing. Filed Sept. 4, 1964, Ser. No. 394,625
Claims priority, application Great Britain, Oct. 3, 1963, 38,977/63
5 Claims. (Cl. 260—2.5)

ABSTRACT OF THE DISCLOSURE

Foamed cellular polymeric materials prepared by the reaction of dihydropyranyl compounds with phenols employing as catalyst an aqueous solution of fluosilicic and fluoboric acids. A halogenated hydrocarbon foaming agent is employed. The proportions of dihydropyranyl ingredient to phenolic ingredient lies in the range 20:3 and 20:7 by weight. The catalyst contains 3% to 50% by weight of fluosilicic acid and 97% to 50% by weight of fluoboric acid. The cellular products have a smooth silky texture and low friability with increased time of rise during foaming.

---

This invention relates to improved compositions suitable for the production of foamed cellular polymeric materials and to the improved foamed cellular polymeric materials obtained therefrom.

In Canadian application Ser. No. 873,718, there are described foamable compositions of a novel type which comprise at least one polymerizable vinyl ether containing at least two vinyl groups per molecule, a foaming agent, an acidic, catalyst and, optionally, at least one compound reactive with said vinyl ether such as a phenolic compound, an aliphatic monohydric or polyhydric alcohol, an epoxidized material, a polycarboxylic acid etc. These compositions yield foamed cellular polymeric materials which are superior to the known polyurethane foams from the standpoint of ingredient toxicity and superior to the known polystyrene foams as to foaming-in-place convenience.

Despite their many useful properties, however, certain of the aforesaid novel foams lack the resiliency, low friability and smooth texture desired for some applications.

It has now been found that if in the above type of foamable compositions, a phenolic compound is used as the vinyl ether-reactive ingredient and there is used as acidic catalytic material a mixture of specific proportions of fluosilicic acid or a salt thereof and perchloric or fluoboric acid or a salt thereof, resilient foamed cellular polymeric materials can be obtained which possess a smooth silky texture and low friability and which during their formation, have a longer rise time.

It is therefore the primary object of this invention to provide improved foamable compositions and improved foamed cellular polymeric materials based on polymerizable vinyl ethers containing at least two vinyl groups per molecule in admixture with phenolic compounds. Another object of this invention is to provide such foamed cellular polymeric materials possessed of the desirable properties of resiliency, low friability and smooth silky texture. Additional objects of the invention will appear hereinafter.

The foamable compositions of this invention comprise at least one polymerizable vinyl ether containing at least two vinyl groups per molecule, at least one phenolic compound compatible therewith, the weight ratio of vinyl ether to phenolic compound being from 20:3 to 20:7, a foaming agent and an acidic catalyst consisting of a mixture of from 3% to 50% by weight of fluosilicic acid or a soluble salt thereof and from 97% to 50% by weight of perchloric or fluoboric acid or a soluble salt thereof. The chemical interaction of the ingredients of said compositions produces the improved foams of this invention.

The foamable compositions of this invention may also include flame retardants, surfactants, dyes, fillers, stabilizers, antioxidants, extenders, plasticizers and viscosity-modifiers.

The polymerizable vinyl ether suitable for use in the foaming compositions of this invention are ethers in which at least two vinyl groups are each joined to an ether oxygen atom. They may have a generic formula such as I 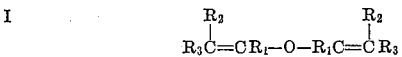

II 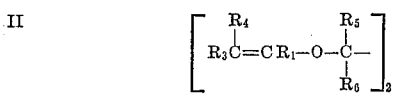

and

III 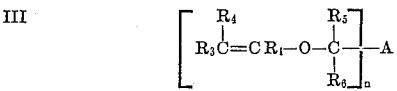

wherein $n$ is an integer having a value of at least 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals, and A is a linking group having a valence equal to $n$.

Examples of the aforementioned vinyl ethers are: divinyl ether, di-isopropenyl ether, butanediol divinyl ether, propylene oxide/polyol condensates of the formulae

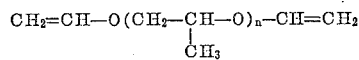

and

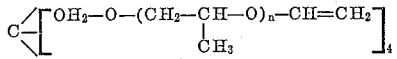

wherein $n$ is any integer, 3,4 - dihydro - 2H - pyran - 2-methyl - (3,4 - dihydro - 2H - pyran - 2 - carboxylate)

described hereinafter, 1,2 - ethanedioxy - bis(3',4' - dihydro-2'H-pyran-2'-carbonyl) of the formula

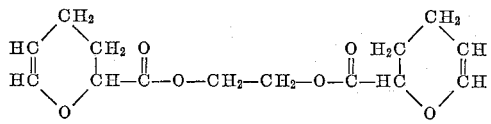

bis - (3,4 - dihydro - 2H - pyran - 2 - methyl) succinate of the formula

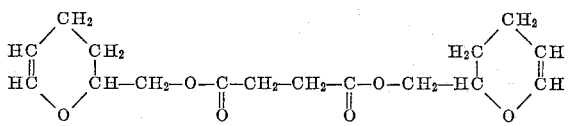

1,2-bis(3',4'-dihydro-2'H-pyran-2'-oxy) ethane of the formula

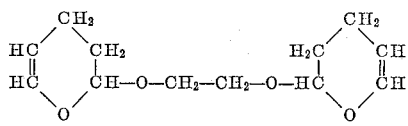

1,1-bis(3',4'-dihydro-2'H-pyran-2'-methoxy) ethane of the formula

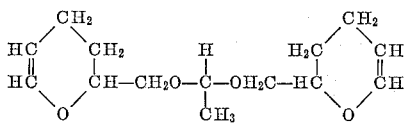

1,2 - ethanedioxy - bis(3',4' - dihydro - 5' - dimethyl-2'H-pyran-2'-carbonyl) of the formula

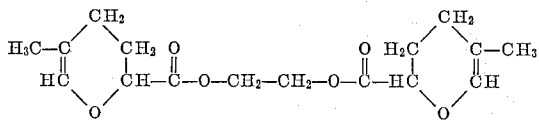

1,2-bis(3',4'-dihydro-5'-methyl-2'H-pyran-2'-oxy) ethane of the formula

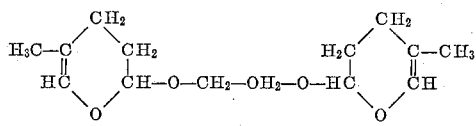

1,1 - bis(3',4' - dihydro-5'-methyl-2'H-pyran-2'-methoxy) ethane of the formula

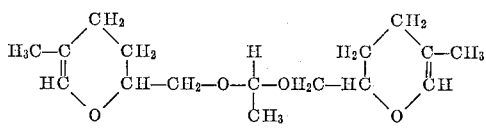

toluene-2,4-bis-(3',4'-dihydro-2'H-pyran-2'-methyl) carbamate of the formula

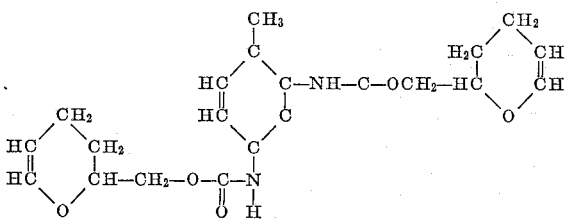

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids. The straight chain vinyl ethers are more reactive than branched chain or cyclic vinyl ethers. It is desirable that the vinyl ethers do not boil during the foam-forming reaction.

The phenolic compounds used as ingredients in the foaming compositions are those aromatic compounds which contain one or more hydroxyl groups in their molecules such as phenol, alkyl substituted phenols, e.g., cresols, halogen substituted phenols, e.g., 2,4,5-trichlorophenol, resorcinol, phloroglucinol, catechol, hydroquinone, 2:2-di-p-hydroxyphenyl propane, low molecular weight phenol-terminated polycarbonates, the condensation products of phenols with aldehydes and ketones, etc.

Foaming agents suitable for use in the foaming compositions of the invention are those which are soluble or dispersible in the other ingredients of the foaming composition and are sufficiently volatile that they vaporize during the formation of the foamed polymeric materials. The heat of the catalyzed polymerization reaction causes the foaming agent to boil, and the vapour forms bubbles which expand during the polymerization reaction to give a low density, foamed polymerized mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

Examples of catalytic soluble salts of fluosilicic acid and fluoboric acid are copper fluosilicate and antimony fluoborate, etc.

The foams possess the desired characteristics only when the fluosilicic acid or its soluble salts constitute from 3% to 50% by weight of the catalytic material. The catalyst ingredients coact in a synergistic relationship. Fluosilicic acid alone will promote the foaming of the ingredients of this invention but the foams so formed do not set. Fluoboric acid alone as catalyst provides brittle foams. It has also been found that the presence of polyhydric alcohols removes the effectiveness of the fluosilicic acid/fluoboric acid catalyst system for enhancing the resilience but does not affect the improvement in rise time.

Suitable proportions of catalyst are between 0.005% and 2.0% by weight of the composition but these amounts are not limitative since the amount of catalyst should be adjusted to the temperature of operation and the foam induction period and rate of set required.

Suitable flame-retardants for incorporation in the foaming compositions include trichloroethylphosphate 2:2-bis(3',5'-dibromo-4'-hydroxyphenyl) propane and polyvinyl chloride with or without antimony oxide.

The preferred surfactants are those of the silicone type, examples of which are disclosed in Belgian Patent Nos. 582,362 and 584,089 i.e., being of the siloxane oxyalkylene copolymer type.

The preferred foamable compositions of this invention comprise at least 65% by weight of the mixture of vinyl ether containing at least two vinyl groups per molecule and phenolic compound in weight ratio of from 20:3 to 20:7, and from 2% to 30% by weight of the foaming agent, the remaining ingredients such as catalytic material and surfactant being present in amounts less than about 5% by weight.

The ingredients of the foaming compositions may simply be mixed by stirring in a vessel and then quickly poured into a mould. They may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam-dispensing machines, the ingredients are mixed under pressure using a foaming agent which is gaseous at the mixing temperature, the pressure being controllably released, and the "frothed" mixture is then dispersed to the point of use. In such a frothing machine, a surfactant is not essential. However, in ordinary dispensing machines wherein the foaming compositions are dispensed before foaming starts, the use of a surfactant is often desirable.

In many recipes, it has been found that reduction of the amount of surfactant to the point where the bubbles just burst as polymerization is complete gives foams of the known "open-cell" structure.

The property of resilience possessed by the foams of this invention consists in their ability to return to their former shape after having been distorted within the elastic limit.

It has been found that foams prepared according to the procedure of this invention in which the catalyst contains from 9% to 35% of fluosilicic acid or soluble fluosilicate possess a much lower friability than foams made using fluoboric acid or boron trifluoride alone. These foams prepared using the above specified catalyst composition can be rolled between the hands without being reduced to a powder. In distinction, foams prepared similarly but with fluoboric acid or boron trifluoride alone as catalyst always reduce to a powder when treated in this manner. The low friability characteristic of the foams of this invention makes them suitable for applications where ability to withstand repeated compression is required. In addition the foams of this invention have a finer cell structure.

It is also characteristic of foams derived from this catalyst system that when the vinyl ether diphenol ratio is 20:5 and the $HBF_4:H_2SiF_6$ ratio is 97:3, the foams possess maximum compression strength.

The foams of this invention also possess improved flow properties during the foaming process in comparison to analogous foams derived from boron trifluoride or fluoboric acid alone. The improved flow properties result in the foaming composition having longer rise times so that the product foams are of lower density.

The foams of this invention are suitable for applications where resilience and lack of friability are advantageous such as the insulation of transportation equipment.

The invention will be more fully illustrated by the following examples in which the percentages given are by weight unless otherwise specified, but it is to be understood that its scope is not limited to the specific embodiments shown.

The preferred vinyl ether used in the examples is 3,4-dihydro - 2H - pyran-2-methyl-(3,4-dihydro-2H-pyran-2-carboxylate) of the following formula:

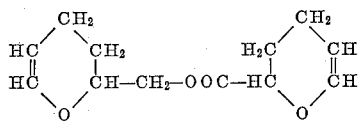

It may be prepared by the self-condensation of acrolein dimer (2-formyl-3,4-dihydro-2H-pyran) in the presence of about 0.3% of aluminium isopropoxide, the reaction temperature being held at 45° C. for 6 hours. A purified product may be obtained by flash distillation in a falling film still at 150° C. under vacuum, but satisfactory foams can be obtained with the undistilled product.

EXAMPLE 1

A series of foams was prepared employing different catalysts admixed with a standard mixture composed as follows:

| | Grams |
|---|---|
| 3,4 - dihydro - 2H - pyran - 2 - methyl - (3,4 - dihydro-2H-pyran-2-carboxylate) | 300 |
| 2:2-di-p-hydroxyphenyl propane | 45 |
| Siloxane oxyalkylene copolymer type silicone surfactant | 1.5 |
| Trichloromonofluoromethane | 75 |

The catalysts comprised mixtures of fluosilicic acid (30% by weight in water) and fluoboric acid (50% by weight in water) and the fluoboric acid solution alone.

The catalyst was added to the standard mixture and rapid stirring was continued for 3 seconds. The mixture was then poured into a mould. The foams obtained are described in Table I.

TABLE I

| Catalyst | | Weight of catalyst, grams | Induction time, secs. | Core density, lbs./cu. ft. | Rise time, secs. |
|---|---|---|---|---|---|
| Percent Fluosilicic acid solution | Percent Fluoboric solution | | | | |
| 0 | 100 | 1.3 | 150 | 2.3 | 193 |
| 3 | 97 | 1.3 | 23 | 1.9 | 38 |
| 6 | 94 | 1.3 | 35 | 2.1 | 49 |
| 9 | 91 | 1.5 | 27 | 2.0 | 38 |
| 12 | 88 | 1.6 | 25 | 2.0 | 36 |
| 15 | 85 | 1.9 | 13 | 1.9 | 21 |
| 20 | 80 | 2.0 | 18 | 1.9 | 29 |
| 30 | 70 | 2.4 | 21 | 1.9 | 30 |

The decrease in foam density with increasing fluosilicic acid content indicates that the fluosilicic acid ingredient causes an increased time of set.

The compression strength of the foams prepared from the mixed catalysts reached a maximum at the 12% fluosilicic acid catalyst member (34.5 p.s.i. parallel to the direction of rise and 15 p.s.i. perpendicular to the direction of rise). The brittle foam prepared from fluoboric acid catalyst alone had compression strengths of 36 p.s.i. parallel to the direction of rise and 24 p.s.i. perpendicular to the direction of rise. The foams prepared from the mixed catalysts, although of lower compression strength, were more resilient.

When this series of foams were examined it was found that those prepared from the catalytic mixtures containing from 6% to 15% of the fluosilicic acid solution had a smooth silky texture and resilience and corresponding low friability not possessed by the others. Their other properties as shown in the table were similar to those of foams prepared using a boron trifluoride catalyst.

EXAMPLE 2

A series of foams was prepared employing different catalysts admixed with a standard mixture composed as follows:

| | Grams |
|---|---|
| 3,4 - dihydro - 2H-pyran-2-methyl-(3,4-dihydro-2H-pyran-2-carboxylate) | 300 |
| 2:2-di-p-hydroxyphenyl propane | 75 |
| Siloxane oxyalkylene copolymer type silicone surfactant | 1.5 |
| Trichloromonofluoromethane | 75 |

The catalysts employed were the same as those described in Example 1. To prepare the foams the catalyst was added to the standard mixture and rapid stirring was continued for 3 seconds. The mixture was then poured into a mould. The foams obtained are described in Table II.

TABLE II

| Catalyst | | Weight of catalyst, grams | Induction time, secs. | Core density, lbs./cu. ft. | Rise time, secs. |
|---|---|---|---|---|---|
| Percent Fluosilicic acid solution | Percent Fluoboric solution | | | | |
| 0 | 100 | 1.4 | 8 | 2.0 | 14 |
| 3 | 97 | 1.35 | 9 | 2.3 | 20 |
| 6 | 94 | 1.3 | 5 | 2.4 | 17 |
| 9 | 91 | 1.5 | 6 | 2.4 | 17 |
| 12 | 88 | 1.6 | 8 | 1.9 | 17 |
| 15 | 85 | 1.9 | 7 | 1.8 | 12 |
| 20 | 80 | 2.0 | 10 | 1.7 | 18 |
| 30 | 70 | 2.3 | 16 | 2.0 | 26 |

The compression strengths of the foams prepared from the mixed catalysts reached a maximum at the 3% fluosilicic acid catalyst member (39 p.s.i. parallel to the direction of rise and 21 p.s.i. perpendicular to the direction of rise). This specific composition of vinyl ether, phenolic, fluosilicic acid and fluoboric acid produces a foam of maximum compression strength. The brittle foam prepared from fluoboric acid catalyst alone had compression strengths of 33 p.s.i. parallel to the direction of rise and 15 p.s.i. perpendicular to the direction of rise.

The foams prepared from the mixed catalysts were more resilient than the foams prepared from fluoboric acid alone.

When the series of foams was examined it was found that those prepared from catalytic mixtures containing from 6% to 15% by weight of the fluosilicic acid solution had a smooth silky texture and resilience and corresponding low friability not possessed by the others. Their other properties as shown in Table II were similar to those of foams prepared using a boron trifluoride catalyst.

Example 3

A series of foams was prepared employing different catalysts admixed with a standard mixture composed as follows.

| | Grams |
|---|---|
| 3,4 - dihydro - 2H-pyran-2-methyl-(3,4-dihydro-2H-pyran-2-carboxylate) | 300 |
| 2:2-di-p-hydroxyphenyl propane | 105 |
| Siloxane oxyalkylene copolymer type silicone surfactant | 1.5 |
| Trichloromonofluoromethane | 80 |

The catalysts employed were the same as in those described in Example 1. To prepare the foams the catalyst was added to the standard mixture and rapid stirring was continued for 3 seconds. The mixture was then poured into a mould.

The foams obtained are described in Table III.

TABLE III

| Catalyst | | Weight of catalyst, grams | Induction time, secs. | Core density, lbs./cu. ft. | Rise time, secs. |
|---|---|---|---|---|---|
| Percent Fluosilicic acid solution | Percent Fluoboric acid solution | | | | |
| 0 | 100 | 1.35 | 10 | 2.2 | 17 |
| 3 | 97 | 1.3 | 8 | 1.9 | 17 |
| 6 | 94 | 1.3 | 6 | 1.9 | 14 |
| 9 | 91 | 1.5 | 6 | 1.9 | 14 |
| 12 | 88 | 1.6 | 7 | 1.9 | 18 |
| 15 | 85 | 1.9 | 4 | 1.8 | 10 |
| 20 | 80 | 2.0 | 7 | 1.8 | 13 |
| 30 | 70 | 2.3 | 11 | 1.9 | 22 |

The decrease in foam density with increasing fluosilicic acid content indicates that the fluoslicic acid ingredient causes an increased of set.

The compression strengths of the foams prepared from the mixed catalysts reached a maximum at the 3% fluosilicic acid catalyst member (31 p.s.i. parallel to the direction of rise and 12 p.s.i. perpendicular to the direction of rise). The brittle foam prepared from fluoboric acid catalyst alone had compression strengths of 35 p.s.i. parallel to the direction of rise and 17 p.s.i. perpendicular to the direction of rise. The foams prepared from the mixed catalysts, although of lower compression strength, were more resilient than the foams prepared from fluoric acid alone.

When the series of foams was examined, it was found that those prepared from catalytic mixtures containing from 6% to 15% by weight of the fluosilicic acid solution had a smooth silky texture and resilience and corresponding low friability not possessed by the others. Their other properties as shown in Table III were similar to those of foams prepared using a boron trifluoride catalyst.

EXAMPLE 4

A series of seven foams was prepared, each preparation containing the following ingredients:

| | Grams |
|---|---|
| 3,4-dihydro-2H-pyran-2-methyl - (3,4 - dihydro - 2H-pyran-2-carboxylate | 20 |
| 2:2-di-p-hydroxyphenyl propane | 5 |
| Siloxane oxyalkylene copolymer type silicone surfactant | 0.1 |
| Trichloromonofluoromethane | 5 |

The catalyst employed consisted of a 50% by weight solution of fluoboric acid in water and a 30% by weight solution of fluosilicic acid in water in the proportions hereinafter specified. The ingredients were mixed with a mechanical stirrer and poured into a mould. The characteristics of the resulting foams are shown in Table IV. It is to be noted that with increasing fluosilicic acid content of the catalyst, the rise time of the resulting foam increases.

TABLE IV

| Catalyst | | Amount of catalyst, drops | Stirring time, secs. | Induction time, secs. | Rise time, secs. |
|---|---|---|---|---|---|
| Percent Fluosilicic acid solution | Percent Fluoboric acid solution | | | | |
| 0 | 100 | 2 | 5 | 10 | 14 |
| 30 | 70 | 2 | 5 | 5 | 8 |
| 40 | 60 | 2 | 5 | 14 | 21 |
| 50 | 50 | 3 | 5 | 18 | 32 |
| 60 | 40 | 3 | 5 | 23 | 43 |
| 70 | 30 | 4 | 5 | 32 | 48 |
| 80 | 20 | 5 | 5 | 47 | 43 |

EXAMPLE 5

A series of seven foams was prepared, each preparation containing the following ingredients:

| | Grams |
|---|---|
| 3,4 - dihydro - 2H - pyran - 2 - methyl - (3,4 - dihydro 2H-pyran-2-carboxylate) | 20 |
| Phenolic novolak resin | 5 |
| Siloxane oxyalkylene copolymer type silicone surfactant | 0.1 |
| Trichloromonofluoromethane | 5 |

The catalyst employed consisted of a 50% by weight solution of fluoboric acid in water and a 30% by weight solution of fluosilicic acid in water in proportions hereinafter specified. The ingredients were mixed with a mechanical stirrer and poured into a mould. The characteristics of the resulting foams are shown in Table V. It is to be noted that with increasing fluosilicic acid content of the catalyst, the rise time of the resulting foam increases.

TABLE V

| Catalyst | | Amount of catalyst, drops | Stirring time, secs. | Induction time, secs. | Rise time, secs. |
|---|---|---|---|---|---|
| Percent Fluosilicic acid solution | Percent Fluoboric acid solution | | | | |
| 0 | 100 | 4 | 5 | 21 | 33 |
| 30 | 70 | 4 | 5 | 40 | 37 |
| 40 | 60 | 5 | 5 | 65 | 32 |
| 50 | 50 | 6 | 5 | 90 | 48 |
| 60 | 40 | 6 | 5 | 125 | 75 |
| 70 | 30 | 7 | 5 | 165 | 60 |
| 80 | 20 | 8 | 5 | 185 | 58 |

EXAMPLE 6

A series of seven foams was prepared, each preparation containing the following ingredients:

| | Grams |
|---|---|
| 3,4 - dihydro - 2H - pyran - 2 - methyl - (3,4 - dihydro 2H-pyran-2-carboxylate) | 20 |
| Catechol | 5 |
| Siloxane oxyalkylene copolymer type silicone surfactant | 0.1 |
| Trichloromonofluoromethane | 5 |

The catalyst employed consisted of a 50% by weight solution of fluoboric acid solution in water and a 30% by weight solution of fluosilicic acid in water in proportions hereinafter specified. The ingredients were mixed with a mechanical stirrer and poured into a mould. The characteristics of the resulting foams are shown in Table VI. It is to be noted that with increasing fluosilicic acid content of the catalyst, the rise time of the resulting foam increases.

TABLE VI

| Catalyst | | Amount of catalyst, drops | Stirring time, secs. | Induction time, secs. | Rise time, secs. |
|---|---|---|---|---|---|
| Percent Fluosilicic acid solution | Percent Fluoboric acid solution | | | | |
| 0 | 100 | 3 | 3 | 4 | 15 |
| 30 | 70 | 4 | 5 | 7 | 10 |
| 40 | 60 | 4 | 5 | 11 | 21 |
| 50 | 50 | 6 | 5 | 15 | 25 |
| 60 | 40 | 7 | 5 | 14 | 27 |
| 70 | 30 | 8 | 5 | 32 | 28 |
| 80 | 20 | 11 | 5 | 39 | 33 |

EXAMPLE 7

The following foaming composition was prepared.

| | |
|---|---|
| 3,4 - dihydro - 2H-pyran-2-methyl-(3,4-dihydro-2H-pyran-2-carboxylate) _____grams__ | 40 |
| 2:2-di-p-hydroxyphenol propane_____do____ | 10 |
| Siloxane oxyalkylene copolymer type silicone surfactant _____do____ | 1.0 |
| Trichloromonofluoromethane _____do____ | 10 |
| 10% copper fluosilicate tetrahydrate ($CuSiF_6 \cdot 4H_2O$) in diethylene glycol_____drops____ | 6 |
| Fluoboric acid (48%–50% in water)_____do____ | 5 |

The ingredients were mixed with a mechanical stirrer. The resulting foam was resilient but lacked the soft silky texture obtained when all aqueous solutions of catalyst were employed.

What we claim is:

1. A foamed cellular polymeric material which is the reaction product of a foamable composition which comprises at least one polymerizable cyclic vinyl ether of the generic formula

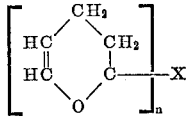

wherein $n$ is an integer having a value of 2 or 3 and X is a linking group having a valence equal to $n$, at least one dihydric phenol compatible therewith, the weight ratio of said vinyl ether to said phenol being from 20:3 to 20:7, a volatile halogenated hydrocarbon foaming agent and an acidic catalyst comprising a mixture of from 3% to 50% by weight of fluosilicic acid and from 97% to 50% by weight of fluoboric acid.

2. A foamed cellular polymeric material as claimed in claim 1 wherein the foamable composition contains 3,4-dihydro-2H-pyran-2-methyl-(3,4-dihydro - 2H - pyran - 2-carboxylate) and 2:2 - di-p-hydroxyphenyl propane in weight ratio of from 20:3 to 20:7.

3. A foamed cellular polymeric material as claimed in claim 1, wherein the foamable composition contains the foaming agent trichloromonofluoromethane.

4. A foamed cellular polymeric material as claimed in claim 1 wherein the foamable composition contains a surfactant.

5. A process for the manufacture of foamed cellular polymeric materials which comprises mixing at least one polymerizable cyclic vinyl ether of the generic formula

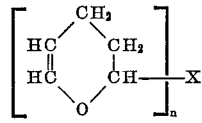

wherein $n$ is an integer having a value of 2 or 3 and X is a linking group having a valence equal to $n$, at least one dihydric phenol compatible therewith, the weight ratio of said vinyl ether to said phenol being from 20:3 to 20:7, a volatile halogenated hydrocarbon foaming agent and an acidic catalyst comprising a mixture of from 3% to 50% by weight of fluosilicic acid and from 97% to 50% by weight of fluoboric acid; and allowing the mixture naturally to self-expand into a foamed cellular polymeric material.

References Cited

UNITED STATES PATENTS

| 2,381,481 | 8/1945 | Anderson | 260—683.15 |
| 3,311,573 | 3/1967 | Graham et al. | 260—2.5 |
| 3,311,575 | 3/1967 | Graham | 260—2.5 |

MURRAY TILLMAN, *Primary Examiner.*

GEORGE F. LESMES, *Examiner.*

M. FOELAK, *Assistant Examiner.*